(12) United States Patent
Hu (10) Patent No.: US 7,509,754 B2
(45) Date of Patent: Mar. 31, 2009

(54) CALIPER

(76) Inventor: Bobby Hu, 8F, No.536-1, Ta Chin Street, Taichung (TW)

(*) Notice: Subject to any disclaimer, the term of this patent is extended or adjusted under 35 U.S.C. 154(b) by 15 days.

(21) Appl. No.: 11/849,474

(22) Filed: Sep. 4, 2007

(65) Prior Publication Data

US 2009/0056160 A1    Mar. 5, 2009

(51) Int. Cl.
*G01B 5/02* (2006.01)
*G01B 3/16* (2006.01)

(52) U.S. Cl. .......................... 33/807; 33/783
(58) Field of Classification Search ............. 33/501.08, 33/501.5, 783, 806, 807, 808
See application file for complete search history.

(56) References Cited

U.S. PATENT DOCUMENTS

| | | | |
|---|---|---|---|
| 1,349,091 A * | 8/1920 | Ormsby .................. | 33/501.5 |
| 1,506,704 A * | 8/1924 | Williamson .............. | 33/807 |
| 3,289,446 A * | 12/1966 | Davey .................... | 33/783 |
| 4,768,953 A * | 9/1988 | Nestor et al. ............ | 33/511 |
| 5,070,623 A * | 12/1991 | Barnes ................... | 33/807 |
| 5,154,003 A * | 10/1992 | Moore .................... | 33/783 |
| 5,210,955 A * | 5/1993 | Lewis .................... | 33/807 |
| 6,739,068 B1 * | 5/2004 | Rinner ................... | 33/806 |
| 7,275,336 B2 * | 10/2007 | Casutt et al. ............ | 33/807 |
| 2001/0037581 A1 * | 11/2001 | Akhavan-Sigari et al. ..... | 33/807 |

* cited by examiner

*Primary Examiner*—G. Bradley Bennett
(74) *Attorney, Agent, or Firm*—Alan Kamrath; Kamrath & Associates PA (57) ABSTRACT

A caliper includes a first leg and a second leg pivotably connected together at first ends thereof. First and second abutting portions are respectively formed on second ends of the first and second legs. First and second slots are respectively defined in the first and second legs and between the first and second ends thereof. An indicator is slideably received in the first and second slots. The indicator is slideable along the first and second slots to move the first and second abutting portions toward each other until the first and the second abutting portions respectively abut against two opposite sides of an object to be gauged by the caliper. The size of the object is indicated by an indicating portion of the indicator that points to a scale on one of the first and second legs.

20 Claims, 7 Drawing Sheets

CALIPER

BACKGROUND OF THE INVENTION

The present invention relates to a caliper and, more particularly, to a caliper for rapidly gauging the size of a nut, bolt head, or fitting.

Figure 7:
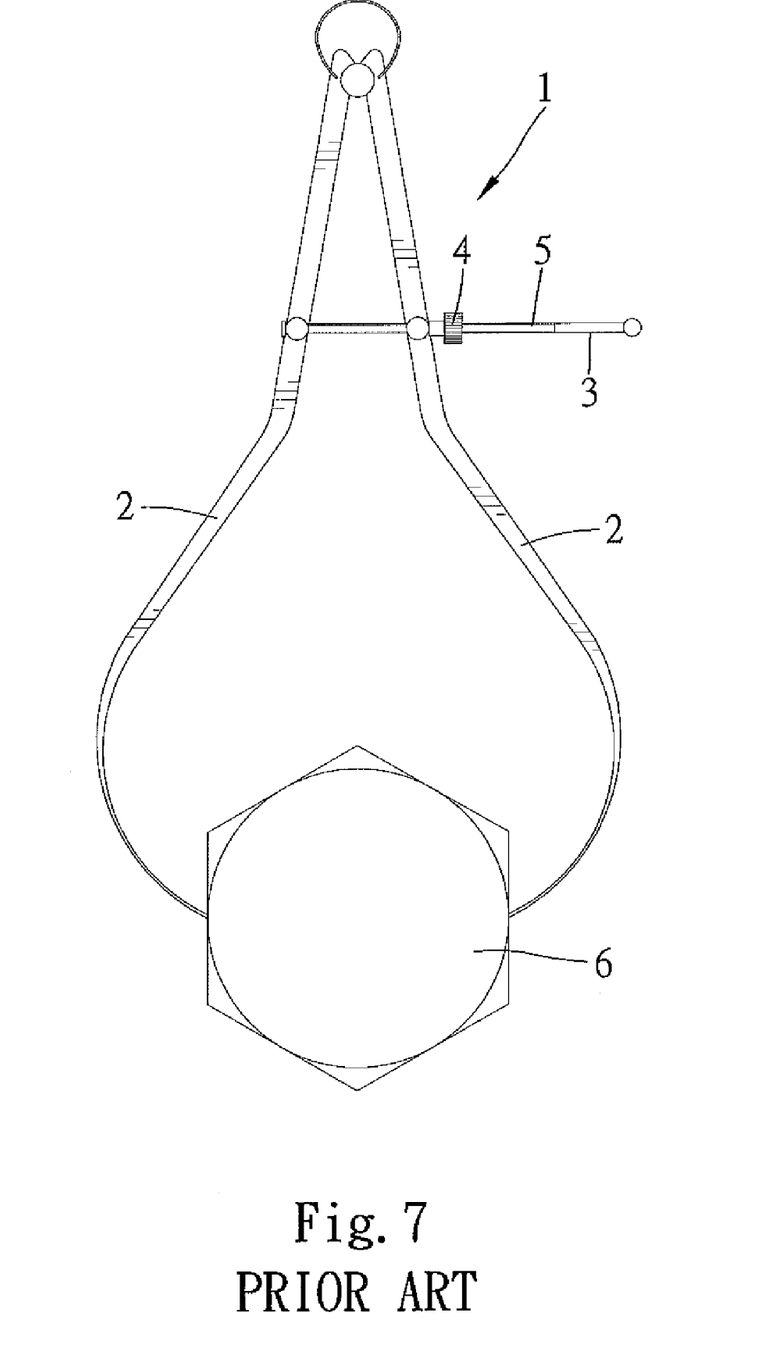
FIG. 7 shows an elevational view of a conventional caliper.

FIG. 7 of the drawings illustrates a typical caliper 1 for measuring an object 6 such as a nut, bolt head, fitting, etc. The caliper 1 includes two legs 2 pivoted together at an end. A rod 3 has an end extended through an intermediate portion of one of the legs 2 to an intermediate portion of the other leg 2. An adjusting knob 4 is threadedly engaged with a threaded section 5 on the rod 3. In use, the adjusting knob 4 is rotated until outer ends of the legs 2 come in contact with two opposite sides of an object 6. The object 6 is then removed, and the size of the object 6 can be known by measuring the distance between the outer ends of the legs 2 with a ruler or the like. The measurement with such a caliper 1 is troublesome and time-consuming.

It is therefore a need for a caliper allowing rapid, reliable measurement of objects.

BRIEF SUMMARY OF THE INVENTION

The present invention solves this need and other problems in the field of size measurement by providing, in a preferred form, a caliper including a first leg and a second leg pivotably connected together at first ends thereof. First and second abutting portions are respectively formed on second ends of the first and second legs. First and second slots are respectively defined in the first and second legs and between the first and second ends thereof. An indicator is slideably received in the first and second slots. The indicator is slideable along the first and second slots to move the first and second abutting portions toward each other until the first and the second abutting portions respectively abut against two opposite sides of an object to be gauged by the caliper. The size of the object is indicated by an indicating portion of the indicator that points to a scale on one of the first and second legs.

In the preferred form, each of the first and second legs includes an outer face facing away the other leg and an inner face facing the other leg. Each of the first and second slots is arcuate and extends from the outer face through the inner face of an associated one of the first and second legs. Each of the first and second abutting portions is in the form of a cylinder having a longitudinal axis parallel to and extending across a thickness between the inner and outer faces of the associated one of the first and second legs, with two ends of the cylinder extending beyond the inner and outer faces of the associated one of the first and second legs. The first and second abutting portions provide reliable abutting against two opposite sides of the object to attain accurate size measurement.

In the preferred form, two metric scales are formed on the outer face of the first leg, and two English scales are formed on the outer face of the second leg. Furthermore, the indicator includes a first indicator member and a second indicator member coupled with the first indicator member. The first indicator member includes a pivotal portion slideably received in the first slot of the first leg and a first operative portion having an anti-slipping section allowing a user to move the first indicator member along the first slot by the anti-slipping section without the risk of slip. The first indicator member further includes two indicating portions respectively on two sides of the first operative portion and respectively facing the metric scales. Furthermore, the first indicator member includes a guiding portion slideably received in the first slot to keep a line passing through the indicating portions in a direction perpendicular to an extending direction of the first slot. The second indicator member includes a pivotal portion slideably received in the second slot of the second leg and pivotably coupled with the pivotal portion of the first indicator member. The second indicator member further includes a second operative portion having an anti-slipping section allowing the user to move the second indicator member along the second slot by the anti-slipping section without the risk of slip. The second indicator member further includes two indicating portions respectively on two sides of the second operative portion and respectively facing the English scales. Furthermore, the second indicator member includes a guiding portion slideably received in the second slot to keep a line passing through the indicating portions of the second indicator member in a direction perpendicular to an extending direction of the second slot.

Operation of the caliper according to the preferred teachings of the present invention is easy, and the object can be rapidly gauged.

The present invention will become clearer in light of the following detailed description of an illustrative embodiment of this invention described in connection with the drawings.

DESCRIPTION OF THE DRAWINGS

The illustrative embodiment may best be described by reference to the accompanying drawings where.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "end", "portion", "section", "longitudinal", "lateral", "spacing", "thickness", and similar terms are used herein, it should be understood that these terms have reference only to the structure shown in the drawings as it would appear to a person viewing the drawings and are utilized only to facilitate describing the invention.

DETAILED DESCRIPTION OF THE INVENTION

A caliper according to the preferred teachings of the present invention is shown in FIGS. 1-6 of the drawings and generally designated 10. The caliper 10 can be utilized to rapidly gauge the size of an object such as a nut, bolt head, fitting, etc.

Figure 1:
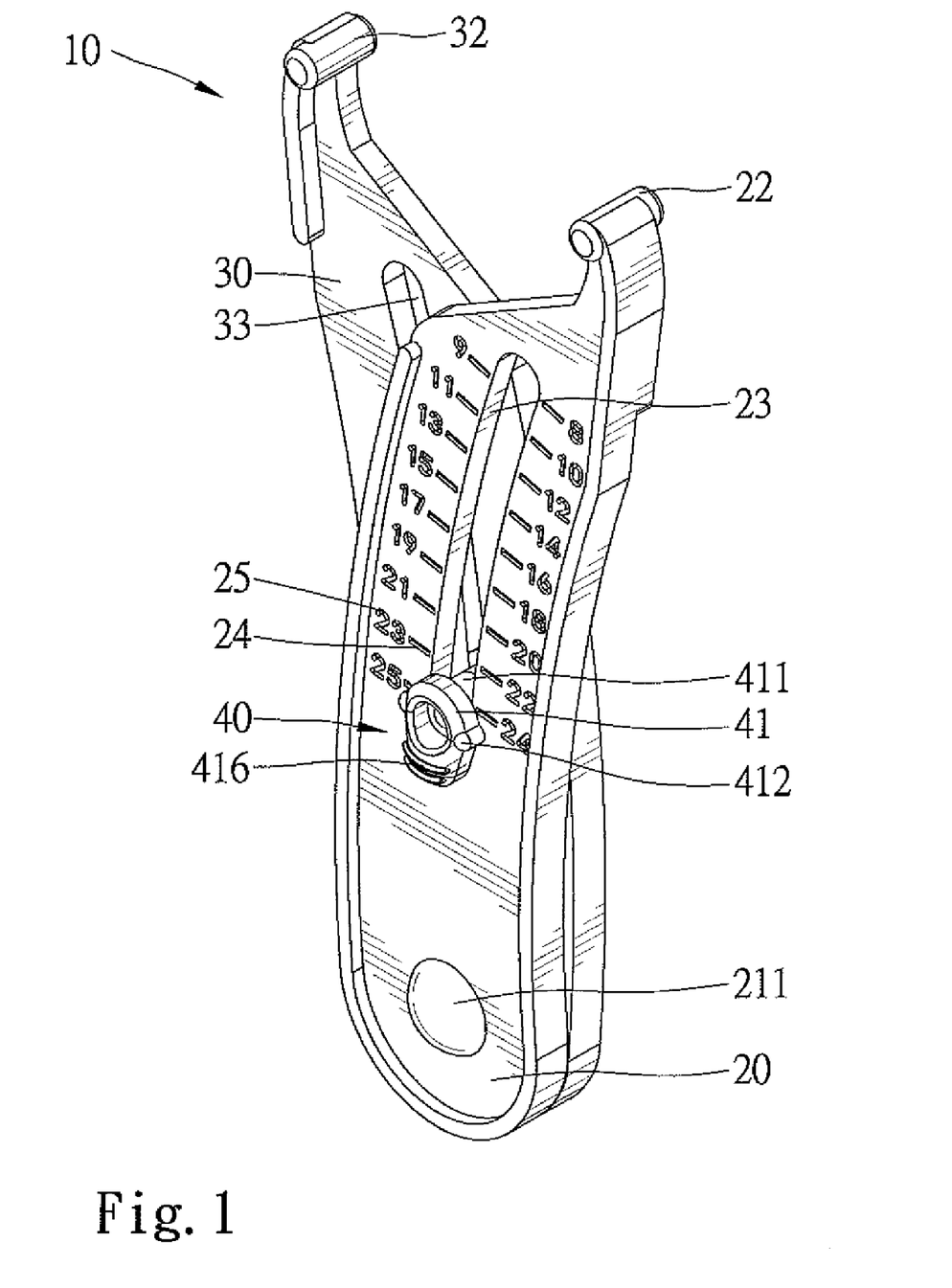
FIG. 1 shows a perspective view of a caliper according to the preferred teachings of the present invention.
Figure 2:
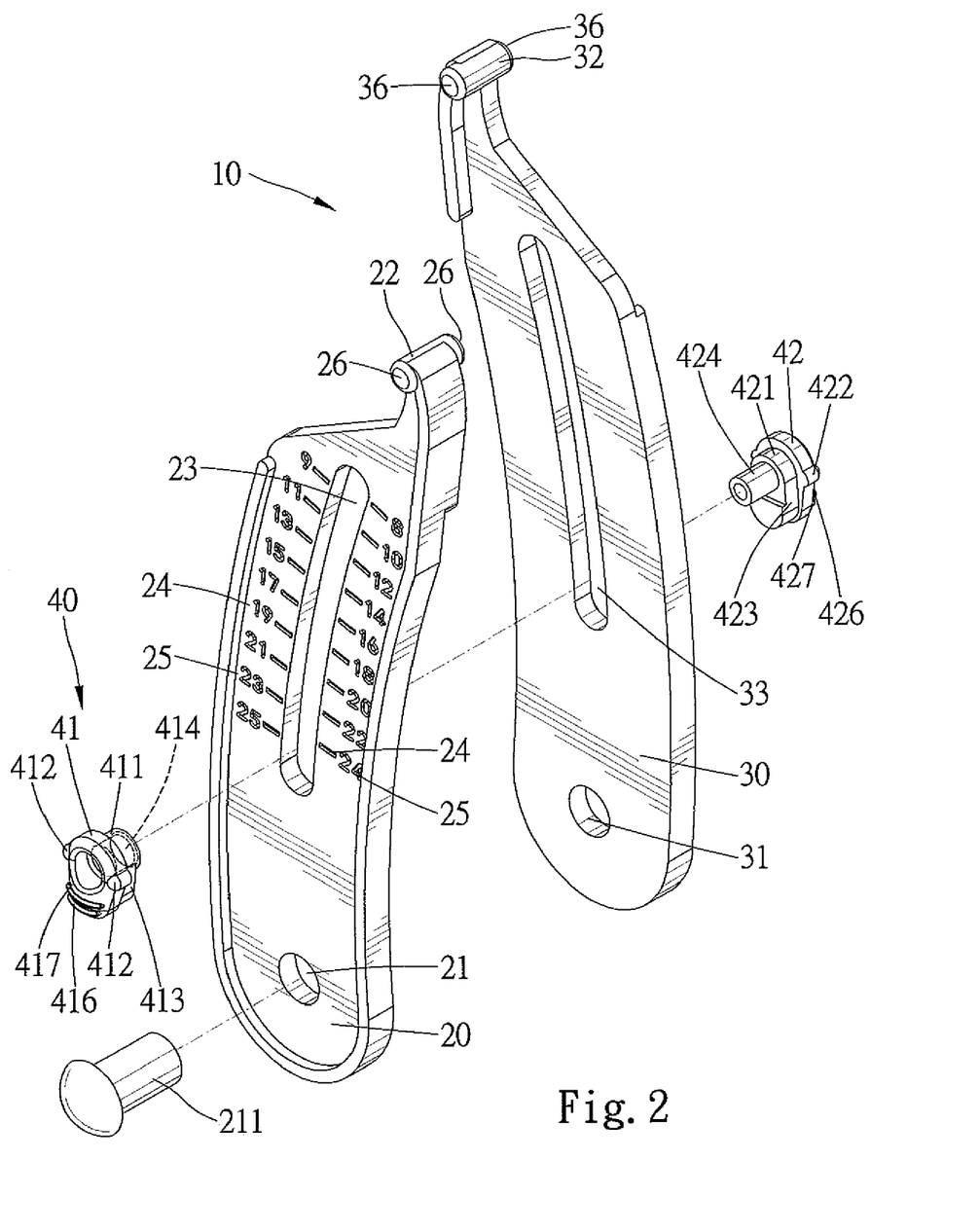
FIG. 2 shows an exploded perspective view of the caliper of FIG. 1.
Figure 3:
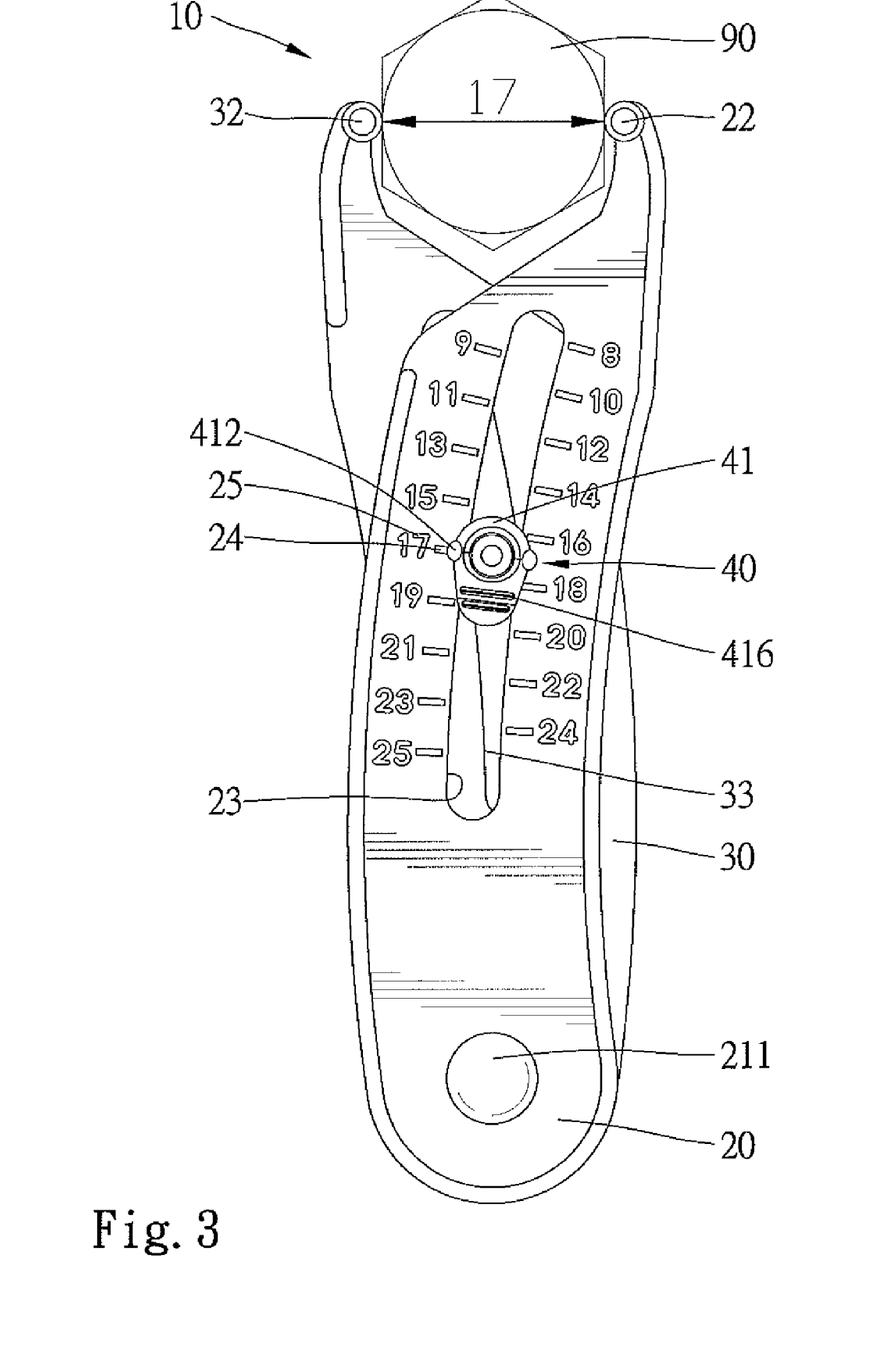
FIG. 3 shows a front elevational view illustrating use of the caliper of FIG. 1 for gauging an object with a metric scale.
Figure 4:
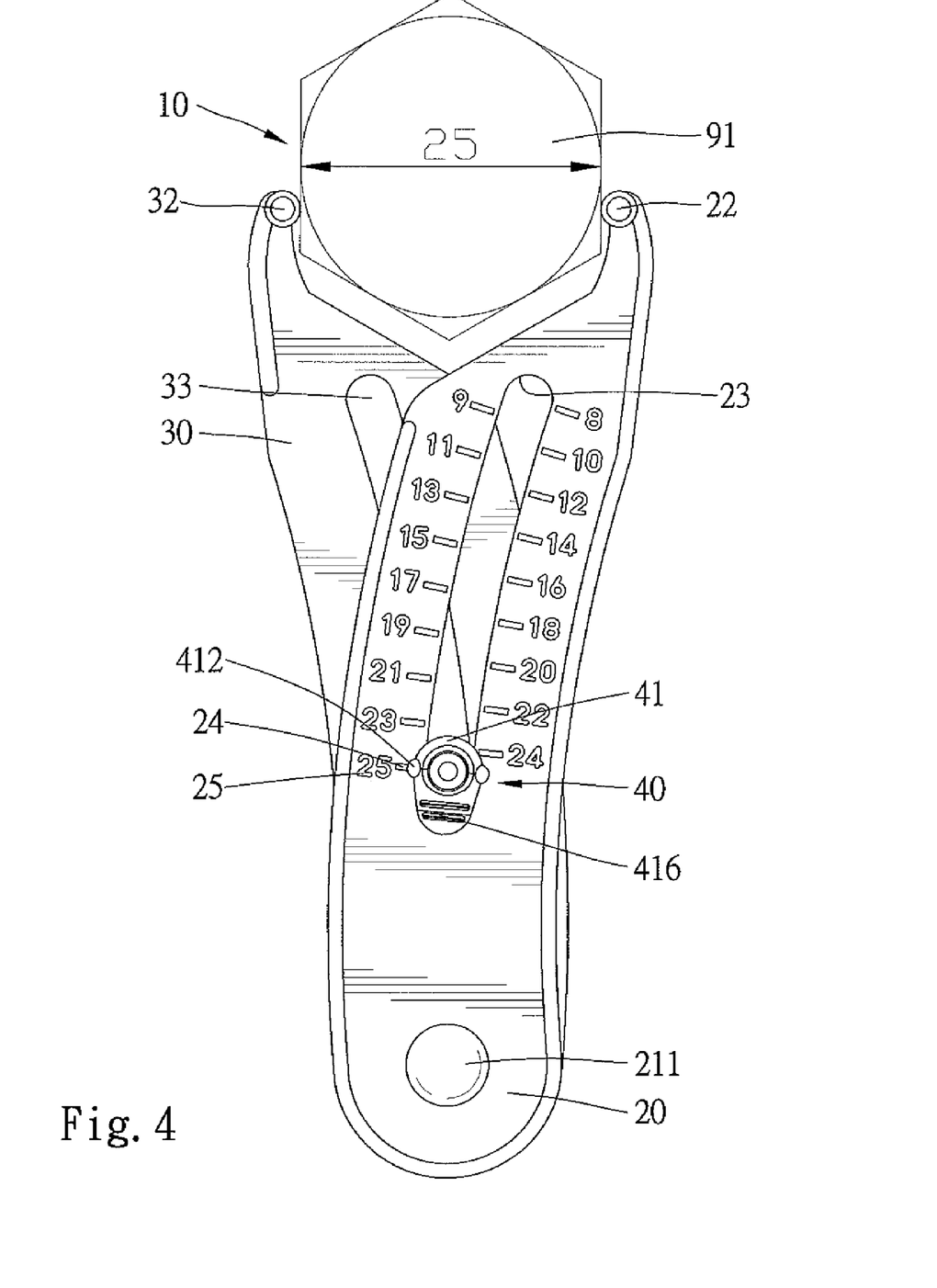
FIG. 4 shows a front elevational view illustrating use of the caliper of FIG. 1 for gauging an object of a larger size with the metric scale.
Figure 5:
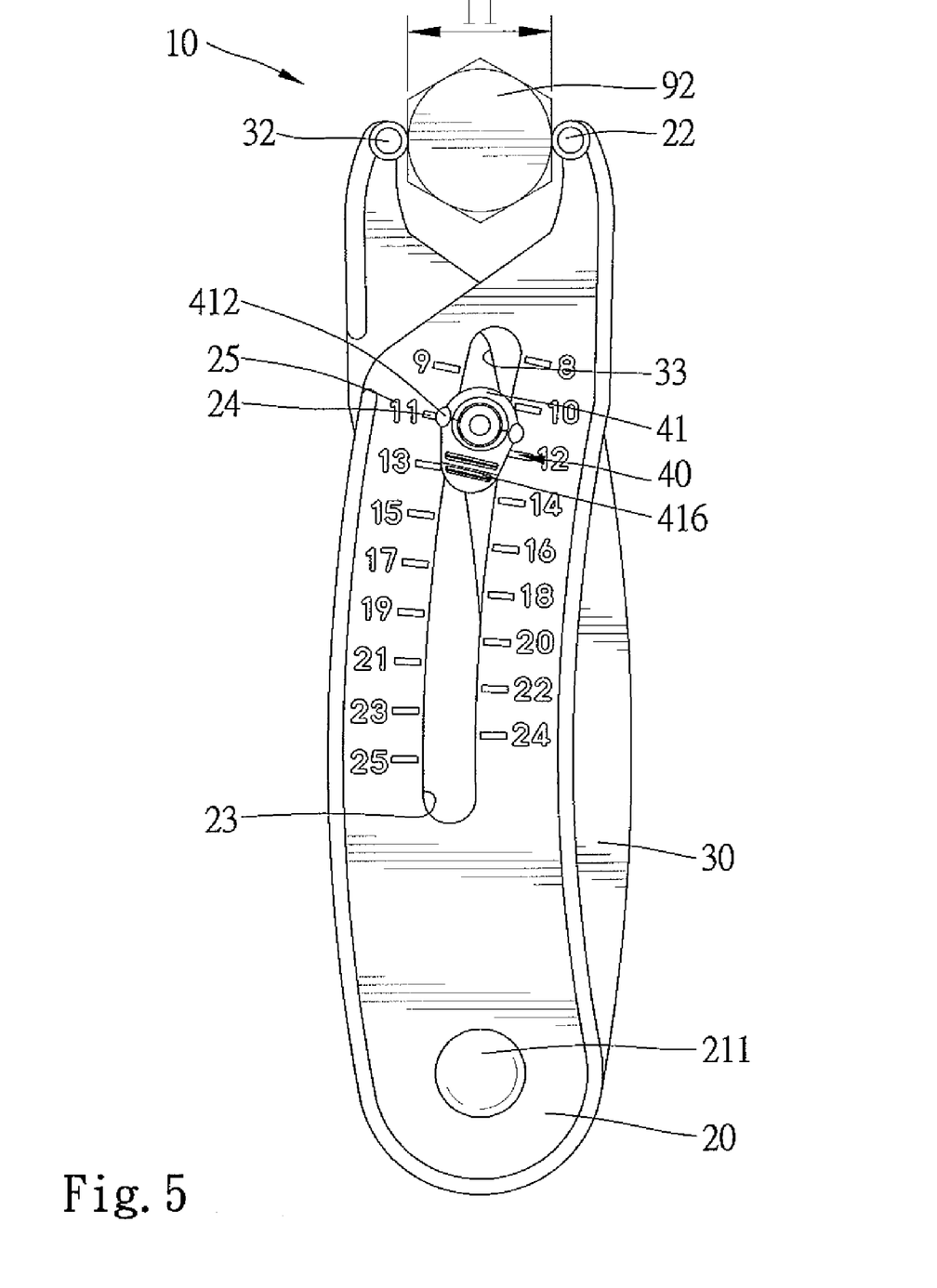
FIG. 5 shows a front elevational view illustrating use of the caliper of FIG. 1 for gauging an object of a smaller size with the metric scale.
Figure 6:
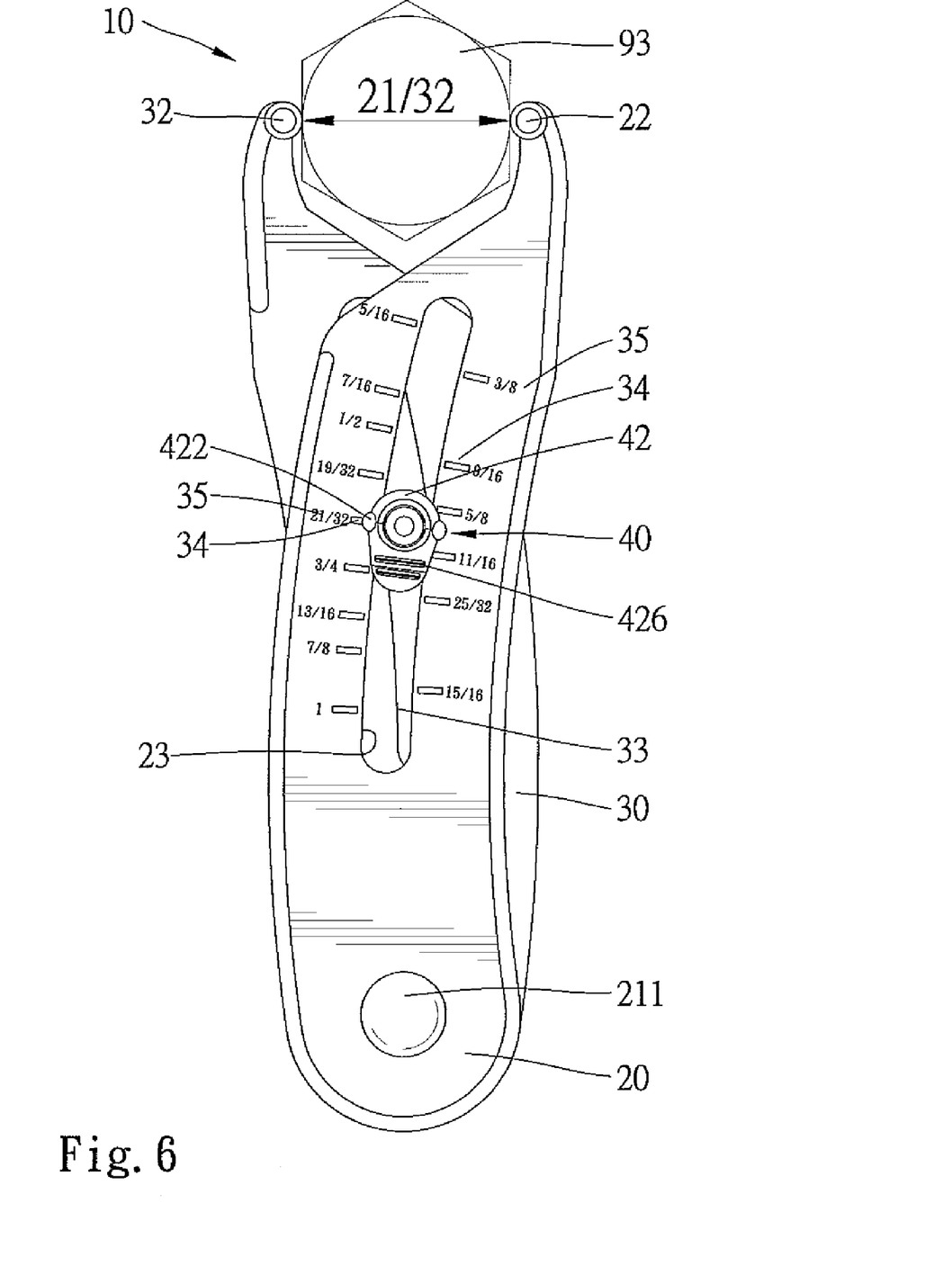
FIG. 6 shows a rear elevational view illustrating use of the caliper of FIG. 1 for gauging an object with an English scale.

According to the preferred form shown, the caliper 10 includes a first leg 20 and a second leg 30. The first leg 20 is substantially a blade having a thickness defined between an outer face and an inner face thereof. The first leg 20 includes a first end having a pivot hole 21 extending from the outer face through the inner face of the first leg 20. The first leg 20 further includes a second end having an abutting portion 22. The abutting portion 22 is substantially a cylinder having a longitudinal axis parallel to and extending across the thickness of the first leg 20, with two ends 36 of the cylinder respectively extending beyond the inner and outer faces of the first leg 20. An arcuate slot 23 is defined between and spaced from the first and second ends of the first leg 20 and extends from the inner face through the outer face of the first leg 20. The outer face of the first leg 20 and includes two metric scales 24 on each of two lateral sides of the arcuate slot 23. Each metric scale 24 has a plurality of marks and graduated figures 25 in metric measuring units. The graduated figures 25 of one of the metric scales 24 are different from those of the other metric scale 24.

In the preferred form shown, the second leg 30 is substantially a blade having a an outer face facing away from the first leg 20 and an inner face facing the first leg 20, defining a thickness between the inner and outer faces of the second leg 30. The second leg 30 includes a first end having a pivot hole 31 extending from the outer face through the inner face of the second leg 30. A pin 211 is extended through the pivot holes 21 and 31 of the first and second legs 20 and 30 to allow relative pivotal movement therebetween. Other pivotal connections between the first and second legs 20 and 30 would be within the skill of the art. The second leg 30 further includes a second end having an abutting portion 32. The abutting portion 32 is substantially a cylinder having a longitudinal axis parallel to and extending across the thickness of the second leg 30, with two ends 36 of the cylinder respectively extending beyond the inner and outer faces of the second leg 30. An arcuate slot 33 is defined between and spaced from the first and second ends of the second leg 30 and extends from the inner face through the outer face of the second leg 30. The outer face of the second leg 30 and includes two metric scales 34 on each of two lateral sides of the arcuate slot 33. Each metric scale 34 has a plurality of marks and graduated figures 35 in English measuring units. The graduated figures 35 of one of the English scales 34 are different from those of the other English scale 34.

An indicator 40 is mounted in the arcuate slots 24 and 34 of the first and second legs 20 and 30. In the preferred form shown, the indicator 40 includes a first indicator member 41 and a second indicator member 42 coupled with the first indicator member 41. The first indicator member 41 includes a pivotal portion 411 slideably received in the arcuate slot 23 of the first leg 20 and an operative portion 417 outside the outer face of the first leg 20. In the most preferred form shown, the pivotal portion 411 has a hole 414. Furthermore, the operative portion 417 includes an anti-slipping section 416 in the form of spaced ribs so that a user can move the first indicator member 41 along the arcuate slot 23 by the anti-slipping section 416 without the risk of slip. Other forms of the anti-slipping section 416 would be within the skill of the art. The first indicator member 41 further includes two indicating portions 412 respectively on two sides of the operative portion 417 and respectively facing the metric scales 24 of the first leg 20. Furthermore, the first indicator member 41 includes a guiding portion 413 protruding from a side of the pivotal portion 411. The guiding portion 413 is slideably received in the arcuate slot 23 and keeps a line passing through the indicating portions 412 in a direction perpendicular to the extending direction of the arcuate slot 23.

In the preferred form shown, the second indicator member 42 includes a pivotal portion 421 slideably received in the arcuate slot 33 of the second leg 30 and an operative portion 427 outside the outer face of the second leg 30. In the most preferred form shown, the pivotal portion 421 has a peg 424 rotatably received in the hole 414 of the first indicator member 41 to allow relative pivotal movements between the first and second indicator members 41 and 42. Furthermore, the operative portion 427 includes an anti-slipping section 426 in the form of spaced ribs so that the user can move the second indicator member 42 along the arcuate slot 33 by the anti-slipping section 426 without the risk of slip. Other forms of the anti-slipping section 426 would be within the skill of the art. The second indicator member 42 further includes two indicating portions 422 respectively on two sides of the operative portion 427 and respectively facing the English scales 34 of the second leg 30. Furthermore, the second indicator member 42 includes a guiding portion 423 protruding from a side of the pivotal portion 421. The guiding portion 423 is slideably received in the arcuate slot 33 and keeps a line passing through the indicating portions 422 in a direction perpendicular to the extending direction of the arcuate slot 33.

Now that the basic construction of the caliper 10 of the preferred teachings of the present invention has been explained, the operation and some of the advantages of the caliper 10 can be set forth and appreciated. When measuring a metric size of an object 90 (FIG. 3) such as a nut, bolt head, fitting, or the like, the abutting portions 22 and 32 of the first and second legs 20 and 30 are placed on opposite sides of the object 90, and the indicator 40 is moved along the arcuate slots 23 and 33 to make the abutting portions 22 and 32 abut against two opposite, parallel sides of the object 90. The indicator 40 stops in a position in the arcuate slots 23 and 33 when the abutting portions 22 and 32 abut against the opposite, parallel sides of the object 90, and the size of the object 90 equal to the spacing between the abutting portions 22 and 32 is indicated by one of the indicating portions 412 that points to one of the graduated figures 25. It can be appreciated a corresponding English size of the object 90 can be readily read from the graduated figures 35 of English metric scales 34 pointed by one of the indicating portions 422 of the second indicator member 42. Objects 91 and 92 of larger and smaller metric sizes can be rapidly measured in a similar manner (see FIGS. 4 and 5). Similarly, an English size of an object 93 (FIG. 6) can be rapidly measured by operating either indicator member 41 or 42.

Since the abutting portions 22 and 32 of the first and second legs 20 and 30 of the caliper 10 according to the preferred teachings of the present invention are cylindrical and have two ends 26 and 36 beyond the thicknesses thereof the abutting portions 22 and 32 can reliably abut against two opposite, parallel sides of an object 90, 91, 92, 93 to be gauged. Measuring errors are less likely to occur, for skew position of the caliper 10 or the object 90, 91, 92, 93 to be gauged is avoided by the abutting portions 22 and 32 of the first and second legs 20 and 30 of the caliper 10 according to the preferred teachings of the present invention. Furthermore, the abutting portions 22 and 32 of the legs 20 and 30 of the caliper 10 according to the preferred teachings of the present invention can be utilized to clamp an object such as a nut, bolt, socket, or the like when desired. Operation of the caliper 10 according to the preferred teachings of the present invention is easy, and the size of the object can easily and rapidly be gauged.

Since the first and second indicator members 41 and 42 are pivotable relative to each other, a line passing through the indicator portions 412, 422 of either indicator member 41, 42 is kept by the associated guiding portion 413, 423 in a direction perpendicular to the extending direction of the associated arcuate slot 23, 33 to allow a user to readily read the size from the graduated figures 25, 35 of the metric scales 24 or the English scales 34. Further, the operative portions 417 and 427 may be located in the slots 23 and 33 without adversely affecting operation of the caliper 10 according to the preferred teachings of the present invention.

Now that the basic teachings of the present invention have been explained, many extensions and variations will be obvious to one having ordinary skill in the art. For example, the scales 24 and 34 may include only figures for indicating the size of the object 90, 91, 92, 93 to be gauged. Furthermore, the scales 24 and 34 can be arranged in different ways to reach the same gauging effect. Further, only one scale 24, 34 on the outer face of each leg 20, 30 is sufficient to provide required gauging. Further, a metric scale 24 and an English scale 34 can respectively be provided on two lateral sides of the arcuate groove 23 or 33 of the first leg 20 or the second leg 30. Further, the scales 24 or 34 on one of the first and second legs 20 and 30 can be omitted if desired. The numbers of the indicating portions 412 and 422 are reduced in response to the reduction or omission of the scales 24 and 34. Further, the indicator 40 may include only one indicator member 41 or 42 if desired. Further, the indicating portions 412 or 422 of the first or second leg 20 or 30 can be replaced with an index line, pointer, or arrow head for indicating the size of the object 90, 91, 92, 93 to be gauged. Further, slots 23 and 33 of other forms and shapes allowing sliding movements of the indicator 40 to adjust the spacing between the first and second abutting portions 22 and 32 of the first and second legs 20 and 30 to gauge the object 90, 91, 92, 93 would be within the skill of the art.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. A caliper comprising:
   a first leg including a first end and a second end having a first abutting portion, with the first leg further including a first slot between the first and second ends thereof and with the first leg further including a first scale;
   a second leg including a first end pivotably connected to the first end of the first leg, with the second leg further including a second end having a second abutting portion, with the first and second abutting portion of the first and second legs being adapted to abut against two opposite sides of an object to be gauged by the caliper, and with the second leg further including a second slot; and
   an indicator slideably received in the first and second slots of the first and second legs, with the indicator including a first indicating portion, with the indicator being movable along the first and second slots to move the first and second abutting portions toward each other until the first and second abutting portions respectively abut against the two opposite sides of the object to be gauged, and with the first indicating portion pointing to the first scale to indicate a size of the object.

2. The caliper as claimed in claim 1, with the first leg including an outer face facing away from the second leg and an inner face facing the second leg, with the first leg including a thickness defined between the inner and outer faces thereof, and with the first slot being arcuate and extending from the outer face through the inner face of the first leg.

3. The caliper as claimed in claim 2, with the first abutting portion extending across the thickness of the first leg and including two ends respectively extending beyond the inner and outer faces of the first leg.

4. The caliper as claimed in claim 3, with the first abutting portion being substantially a cylinder having a longitudinal axis parallel to the thickness of the first leg.

5. The caliper as claimed in claim 2, with the first scale being formed on the outer face of the first leg and located on one of two lateral sides of the first slot, with the outer face of the first leg further including a second scale on the other lateral side of the first slot, and with the first and second scales having identical measuring unit.

6. The caliper as claimed in claim 5, with the indicator including a first indicator member slideably received in the first slot, with the first indicator member further including a first operative portion having two sides, with the first indicating portion being formed on one of the two sides of the first operative portion and facing the first scale, with the first indicator member further including a second indicating portion on the other side of the first operative portion and facing the second scale, with the first indicator member being movable along the first slot to move the first and second abutting portions toward each other until the first and second abutting portions respectively abut against the two opposite sides of the object to be gauged, and with one of the first and second indicating portions pointing to one of the first and second scales to indicate the size of the object.

7. The caliper as claimed in claim 6, with the first indicator member further including a guiding portion slideably received in the first slot, and with the guiding portion keeping a line passing through the first and second indicating portions in a direction perpendicular to an extending direction of the first slot.

8. The caliper as claimed in claim 6, with the operative portion further including an anti-slipping section adapted to be operated by a user for moving the first indicator member along the first slot.

9. The caliper as claimed in claim 6, with the second leg including an outer face facing away from the first leg, with the indicator further including a second indicator member slideably received in the second slot and pivotably coupled with the first indicator member, with the second indicator member including a second operative portion having two sides, with the second leg further including third and fourth scales on the outer face thereof and respectively located on two lateral sides of the second slot, with the third and fourth scales having a measuring unit different from that of the first and second scales, with the second indicator member further including third and fourth indicating portions respectively on the two sides of the second operative portion of the second indicator member and respectively facing the third and fourth scales, with the second indicator member being movable along the second slot to move the first and second abutting portions toward each other until the first and second abutting portions respectively abut against the two opposite sides of the object to be gauged, and with one of the third and fourth indicating portions pointing to one of the third and fourth scales to indicate the size of the object in the measuring unit of the third and fourth scales.

10. The caliper as claimed in claim 9, with the second indicator member further including a guiding portion slideably received in the second slot, and with the guiding portion of the second indicator member keeping a line passing through the third and fourth indicating portions in a direction perpendicular to an extending direction of the second slot.

11. The caliper as claimed in claim 1, with the second leg including an outer face facing away from the first leg and an inner face facing the first leg, with the second leg including a thickness defined between the inner and outer faces thereof, and with the second slot being arcuate and extending from the outer face through the inner face of the second leg.

12. The caliper as claimed in claim 11, with the second abutting portion extending across the thickness of the second leg and having two ends respectively extending beyond the inner and outer faces of the second leg.

13. The caliper as claimed in claim 12, with the second abutting portion being substantially a cylinder having a longitudinal axis parallel to the thickness of the first leg.

14. The caliper as claimed in claim 11, with the second leg further including a second scale on the outer face thereof; and with the second scale having a measuring unit different from that of the first scale.

15. The caliper as claimed in claim 14, with the second scale being on one of two lateral sides of the second slot, and with the outer face of the second leg further including a third scale on the other lateral side of the second slot.

16. The caliper as claimed in claim 1, with the first leg including an outer face facing away from the second leg and an inner face facing the second leg, with the first slot extending from the outer face through the inner face of the first leg, with the first scale being formed on the outer face of the first leg, with the second leg including an outer face facing away from the first leg and an inner face facing the first leg, with the second slot extending from the outer face through the inner face of the second leg, with the second leg further including a second scale on the outer face thereof and having a measuring unit different from that of the first scale, with the indicator including a first indicator member slideably received in the first slot and a second indicator member slideably received in the second slot and pivotably coupled with the first indicator member, with the first indicating portion being formed on the first indicator member, with the second indicating member including a second indicating portion, with the first and second indicator members being respectively movable along the first and second slots to move the first and second abutting portions toward each other until the first and second abutting portions respectively abut against the two opposite sides of the object to be gauged, and with one of the first and second indicating portions pointing to one of the first and second scales to indicate the size of the object.

17. The caliper as claimed in claim 16, with the first leg including a thickness between the inner and outer faces thereof, with the first abutting portion extending across the thickness of the first leg and including two ends respectively extending beyond the inner and outer faces of the first leg.

18. The caliper as claimed in claim 17, with the first abutting portion being substantially a cylinder having a longitudinal axis parallel to the thickness of the first leg.

19. The caliper as claimed in claim 16, with the second leg including a thickness between the inner and outer faces thereof, with the second abutting portion extending across the thickness of the second leg and including two ends respectively extending beyond the inner and outer faces of the second leg.

20. The caliper as claimed in claim 19, with the second abutting portion being substantially a cylinder having a longitudinal axis parallel to the thickness of the second leg.

\* \* \* \* \*